United States Patent [19]
Oliver

[11] Patent Number: 5,488,654
[45] Date of Patent: Jan. 30, 1996

[54] TELEMETRY DEVICE INCLUDING A DYNAMIC OFF-HOOK DETECTOR CAPABLE OF OPERATIONG IN A PULSE-DIALING ENVIRONMENT

[75] Inventor: Stewart W. Oliver, Venice, Calif.

[73] Assignee: Telegenics, Inc., Los Angeles, Calif.

[21] Appl. No.: 128,864

[22] Filed: Sep. 29, 1993

[51] Int. Cl.$^6$ ................................................ H04M 11/00
[52] U.S. Cl. ............................................ 379/106; 379/107
[58] Field of Search ................................ 379/106, 107, 379/40, 51, 92, 355, 216, 161, 182, 194, 193, 377, 102, 104, 105; 340/870.02

[56] References Cited

U.S. PATENT DOCUMENTS

| | | | |
|---|---|---|---|
| 3,553,376 | 1/1971 | Bogaant et al. | 379/107 |
| 4,455,453 | 6/1984 | Parasekvakos et al. | 379/107 |
| 4,833,618 | 5/1989 | Verma et al. | 379/107 |
| 5,202,916 | 4/1993 | Oliver | 379/106 |
| 5,204,896 | 4/1993 | Oliver | 379/106 |
| 5,235,634 | 8/1993 | Oliver | 379/106 |

*Primary Examiner*—Jason Chan

[57] ABSTRACT

A telemetry device is provided including a dynamic off-hook detector which is capable of determining when a contending telephone device comes off-hook even when the telemetry device is engaged in pulse dialing. The technique is directly applicable to "current robbing" type dynamic off-hook detectors which sense the current robbed away from the telemetry device when a contending telephone device comes off-hook. The device includes a static off-hook detector or line status indicator for determining when a contending telephone device goes off-hook during the static state of the telemetry device. The dynamic off-hook detector of the telemetry device determines when a contending telephone device goes off-hook while the telemetry device is in the active state, namely while the telemetry device is seizing the phone line for the purpose of communicating collected information to a central station. The telemetry device avoids the problem of pulse dialing interfering with the operation of the dynamic off detector by monitoring the static off-hook indicator during the on-hook portions of the dial pulse. If, during the on-hook portion of the dial pulse, an indication is received that a contending device has gone off-hook, then the dynamic off hook detector of the telemetry device disengages the phone line and returns the telemetry device to the static state.

6 Claims, 2 Drawing Sheets

5,488,654

TELEMETRY DEVICE INCLUDING A DYNAMIC OFF-HOOK DETECTOR CAPABLE OF OPERATIONG IN A PULSE-DIALING ENVIRONMENT

CROSS REFERENCE TO RELATED PATENT APPLICATIONS

This patent application relates to my copending patent application entitled "Telemetry Device Including A Dynamic Off-Hook Detector", (Ser. No. 08/128,865 therefore) filed concurrently herewith and assigned to the same assignee.

BACKGROUND OF THE INVENTION

This invention relates in general to data collection systems which use remotely located telemetry devices to transfer telemetry data from a remote site to a central processing location. More particularly, the invention relates to automatic meter reading (AMR) systems which use conventional subscriber telephone lines to transfer telemetry data, in the form of utility meter readings, from a customer's premises to a central processing location.

Prior to the existence of automatic meter reading (AMR) systems, the most common method for determining the amount of commodity delivered to a utility customer was to manually read a meter at, or in close proximity to, the consumer premises. Because the utility meters were located at the point where the utility commodity was dispensed to the customer, it became necessary for utility companies to establish routes where a "meter-reader" periodically visited each meter on the route to record the amount of utility product consumed.

At present, many utilities, including gas, electric and water companies, continue to send meter-readers to consumer residences' to collect utility meter readings. However, there are practical limitations as to how often and how efficiently this procedure can be manually performed. For instance, weather and the ability to gain access to meters themselves (which were often inside the consumer's residence) directly impact the efficiency of this manual procedure. Today, where it is desirable for the utility to have almost instantaneous access to any meter, the manual method for collecting these readings is becoming both economically and operationally obsolete in view of the more sophisticated and reliable automatic techniques now available.

One very practical method for automating the process of collecting utility meter readings utilizes the existing telephone system, thereby taking advantage of the already widespread availability of telephone service to both residential and business premises. Using this existing infrastructure, remotely located telemetry devices (at each consumer's premises) electronically upload utility meter readings as telemetry data to a central processing location via the subscriber telephone lines. This process is analogous to the procedure used by many PC users to electronically upload files by the use of a modem connected to the subscriber's telephone line, except that the AMR procedure is fully automatic. This invention relates to those AMR systems which utilize telephone line telemetry techniques.

In practice, the actual telemetry device is called a meter interface unit (MIU). Located at the customer premises, the MIU, as the name implies, is an interface between two different electrical environments. One side of the MIU, called the meter side or control side, is connected to one or more utility meters while the remaining side of the MIU is connected in parallel across the subscriber telephone line. In this regard, the telephone line side of the MIU is connected to the phone line in a manner identical to that used to add an additional extension phone, answering or FAX machine. Other than connecting the MIU to the subscriber line, no modification of the existing telephone line wiring is required.

In one particular type of AMR system, a real time clock within the MIU activates the device at a prescribed date and time. Once activated, the MIU seizes the phone line, dials a preprogrammed telephone number to connect with a central processing location, reads the utility meters connected to it and then uploads the telemetry data via the telephone line. Automatic meter reading systems which utilize this technique are known as dial-inbound systems, since the MIU dials into a data processing center.

Functionally, the MIU can be considered to be a "smart" telephone in that it automatically determines when the phone line is available for use, takes itself off-hook, dials a preprogrammed telephone number, communicates over the phone line, and then hangs up. Likewise, the telephone central office system cannot distinguish the MIU operation from a manual telephone call the subscriber might make.

Since the telemetry transaction typically takes only a few seconds to complete, the MIU normally resides in a low power, standby condition until such time as the programming of the MIU's real time clock causes the device to be activated again. Therefore, the MIU is said to be in a static mode between telemetry transactions and in a dynamic mode while engaged in the transfer of telemetry data across the telephone line.

Because it is not acceptable for the MIU to disrupt or otherwise interfere with the normal operation of subscriber telephone line, the MIU must be capable of detecting when the subscriber phone line is or is not in use. As noted before, the MIU is in either a static mode or a dynamic mode. As a result, the off-hook detector consists of not one function but two, namely a "dynamic off-hook detector" and a "static off-hook detector", where the terms dynamic and static coincide with the current mode of the MIU.

At first glance, the design of off-hook detectors may seem deceptively simple. However, getting them to function reliably, in practice, is a task requiring specialized design knowledge and skill. My patent, entitled Signal Processing Circuit For Use In Telemetry Devices, U.S. Pat. No. 5,202,916, the disclosure thereof being incorporated herein by reference, describes some of the complexities involved in designing a static off-hook detector for an MIU. Whereas the static off-hook detector serves to prevent the MIU from going to the dynamic (off-hook) mode while the subscriber line is in use, the dynamic off-hook detector permits the MIU to immediately disengage itself from the phone line should the subscriber attempt to use the telephone while the MIU is actively engaged in a telemetry transaction.

When a telephone device is taken off-hook, the impedance at the terminals of that device drops from a very high on-hook impedance to a few hundred ohms. With the normally open end of the subscriber line now terminated with this low impedance, the telephone set draws a loop current from the central office switch of approximately 40 mA. As long as loop current is being drawn, the central office switch sees the subscriber line as being off-hook. The telephone audio signal appears as a direct modulation of the loop current, as an AC signal superimposed on the DC loop current.

Many dynamic off-hook detectors function by sensing changes in the subscriber loop current to detect when contention for the subscriber line has occurred. For example, the invention described and claimed in my copending patent application entitled "Telemetry Device Including A Dynamic Off-Hook Detector", (Ser. No. 08/128,865) sets forth one such system. The disclosure of patent application "Telemetry Device Including A Dynamic Off-Hook Detector", (Ser. No. 08/128,865) is incorporated herein by reference. Basically, when another telephone device comes off-hook, it appears in parallel with the active MIU, thereby shunting current away from the telemetry device or "robbing current" therefrom. By detecting the "current robbing" effect caused on the MIU by the contending device, a dynamic off-hook detector can be implemented.

Another telemetry device including a dynamic off-hook detector which senses current robbing by the contending device to determine line status is described and claimed in my patent entitled "Outbound Telemetry Device", U.S. Pat. No. 5,204,896, the disclosure of which is incorporated herein by reference.

Although it is rapidly being supplanted by the DTMF dialing format (popularly called touch tone dialing), pulse dialing remains the only universally accepted dialing format. In fact, pulse dialing is still in wide use, especially in Europe. As a result, some conventional MIU devices do not even incorporate tone dialing and those which do often revert to the pulse dialing format if the MIU is not successful after one inbound dialing attempt.

The "pulse dialing" or rotary pulse format is based upon the mechanical rotation of the old-style telephone dial which interrupts the loop current in a prescribed manner. Because the make and break action of this rotary switch alternately connects and disconnects the telephone device, the formal designation for pulse dialing is "loop disconnect signalling." Both the break/make ratio (typically 60%) and the pulse rate (typically 10 pps) are specified parameters in the format.

Although the pulse dialing format is universal, it can take up to one second per digit to dial the designated telephone number. Consequently, since it requires several seconds to pulse dial, there is a high probability that if the telemetry session is interrupted, it will be while the MIU is pulse dialing. Ideally, should this occur, the MIU must surrender up the telephone line and disengage itself.

Again emphasizing that the term dynamic in dynamic off-hook detector refers to the mode of the MIU, a unique situation arises when the MIU attempts to use pulse dialing. Recalling that pulse dialing involves the MIU going on-hook and off-hook to pulse the loop current, the dynamic off-hook detector, which normally functions by sensing the current shunted away from the active MIU, has no current to measure while the MIU is in the on-hook portion of the dial pulse. Corresponding to the typical break/make ratio, the average loop current during pulse dialing would drop to 60% of its nominal value which the dynamic off-hook detector would interpret as another off-hook telephone device. Consequently, the MIU experiences current robbing during pulse dialing and would disengage itself from the telephone line shortly after pulse dialing began.

To avoid this undesirable effect, one approach is to disable the dynamic off-hook detector during pulse dialing. While this might adequately solve the immediate problem, it has the simultaneous disadvantage of disabling the dynamic off-hook detector function entirely while the MIU was pulse dialing. Consequently, if a telemetry session was interrupted while the telemetry device was pulse dialing, the contention for the subscriber telephone line will go undetected and the MIU will not release the phone line, as it should.

SUMMARY OF THE INVENTION

Accordingly, one object of the present invention is to provide a telemetry device including a dynamic off-hook detector which remains operational during pulse dialing.

In accordance with one embodiment of the present invention, a telemetry device is provided for collecting and transmitting data over a phone line to a central station. The telemetry device includes a data collecting circuit for collecting data at a remote location. The telemetry device also includes a transmitter, coupled to the collecting circuit, for transmitting the data over the phone line to the central station during an active state of the device in which the device seizes the phone line, the device otherwise being in a static state when the device is not seizing the phone line. The telemetry device further includes a static off-hook detector, coupled to the phone line, for determining when a contending device seizes the phone line while the device is in the static state. The telemetry device also includes a pulse dialer, coupled to the phone line, for dialing the central station at a predetermined time. The pulse dialer generates a dial pulse with alternating on-hook portions and off-hook portions. The telemetry device further includes a dynamic off-hook detector, coupled to the static off-hook detector, for disengaging the device from the phone line during pulse dialing when during an on-hook portion of the dial pulse the static off-hook detector indicates that a contending device has seized the phone line.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

I. Theory Of Operation

The MIU of the present invention includes a static off-hook detector which serves to prevent the MIU from entering the dynamic mode while the subscriber telephone line is in use. Thus, the static off-hook detector is in effect a "line status indicator" while the MIU is in an on-hook (static) mode. It is important to appreciate the fact that the static off-hook detector indicates when the telephone line is use by the subscriber. More information with respect to static off-hook detectors is provided in my patent entitled Signal Processing Circuit For Use In Telemetry Devices, U.S. Pat. No. 5,202,916, the disclosure of which is incorporated herein by reference.

It is noted that pulse dialing corresponds to the MIU switching between an on-hook and off-hook condition in a prescribed manner. In accordance with the telemetry device or meter interface unit of the present invention, the instantaneous output of the static-off-hook detector is monitored during the on-hook portion of the dial pulse. If during this interval the static off-hook detector indicates that another telephone device has been taken off-hook, then MIU logic prevents the telemetry device from completing the off-hook portion of the dial pulse cycle, thereby effectively disconnecting it from the telephone line. In other words, this technique looks for an on-hook indication between the break/make cycles of the pulse dialing sequence. If an on-hook indication is found during that time period, then no contention exists and the MIU continues with the pulse dialing and telemetry exchange.

II. Schematic Description: MIU Overview

Figure 1A:
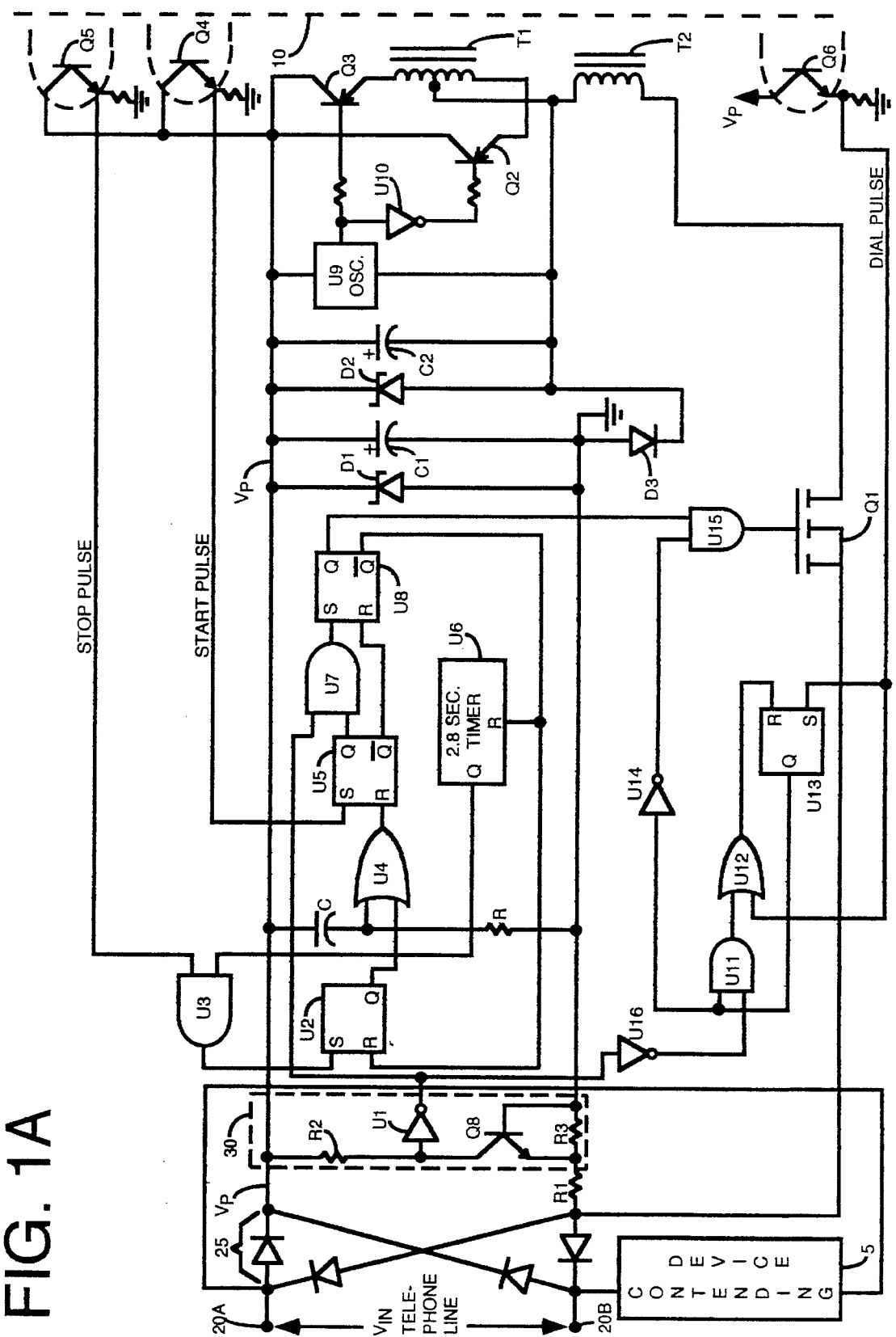
FIG. 1A is a block diagram of the telephone line side of the meter interface unit of the present invention.
Figure 1B:
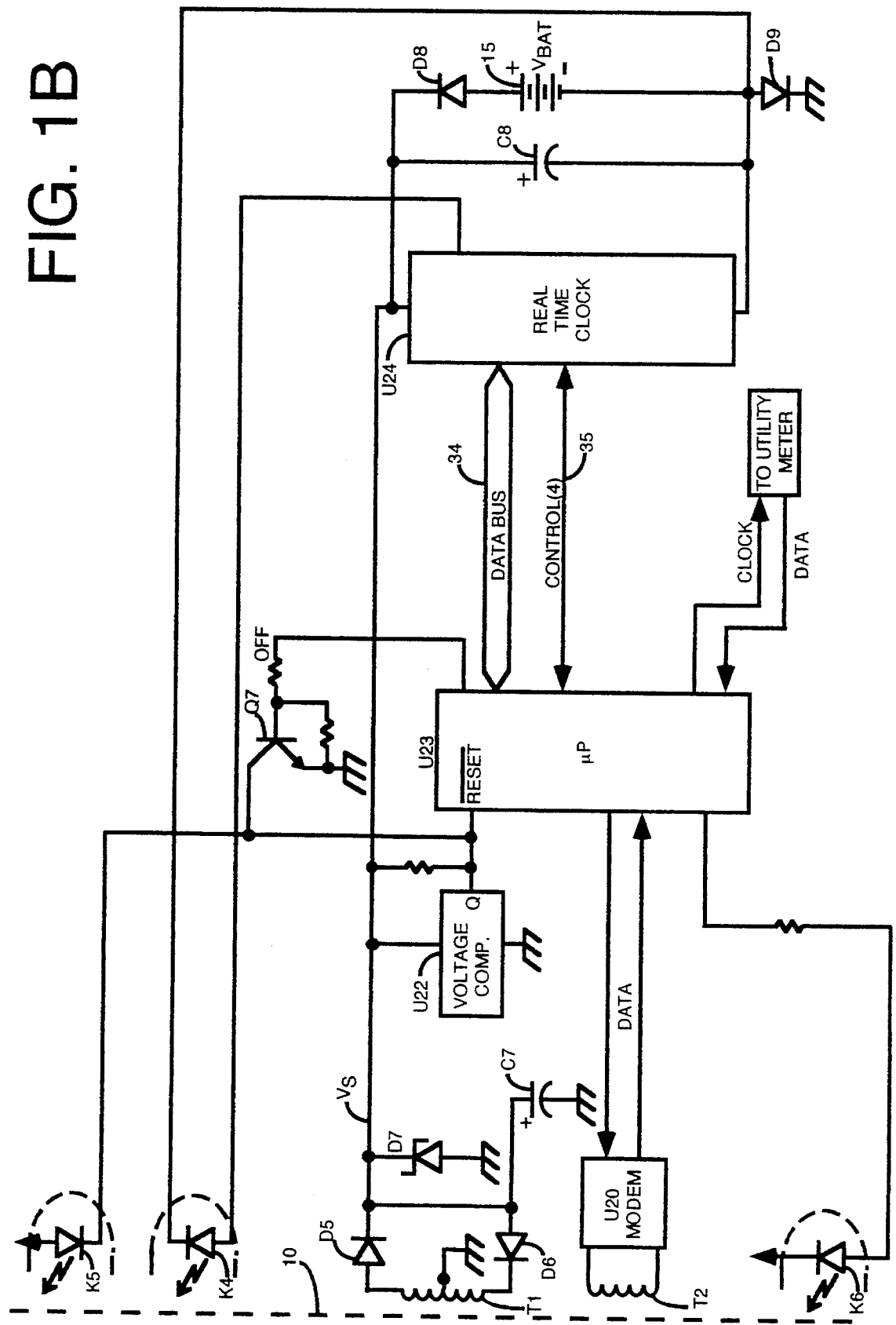
FIG. 1B is a block diagram of the meter side of the meter interface unit of the present invention.

FIG. 1A and 1B show a simplified schematic diagram of an MIU as being composed of two parts. FIG. 1A shows the components on the telephone line side of the MIU (alternatively referenced as the primary side), while FIG. 1B shows the components on the meter side (alternatively referenced as the control side). It is noted that each side is electrically isolated from the other, either optically, by the use of opto-couplers, or magnetically, by the use of transformers. This point of demarcation is collectively referred to as an isolation barrier and is designated as barrier 10 in FIG.'s 1A and 1B. Functionally, isolation barrier 10 protects equipment and personnel on either side of the MIU and also assures that the telephone line remains electrically balanced and isolated from ground, as it must for proper operation.

With regard to the MIU itself, the terms meter and telephone line side more accurately describe how the telemetry device is electrically connected than how the MIU is operationally partitioned. For instance, because the meters attached to the MIU are typically read by a serial communication protocol similar to RS-232, a low power microprocessor, such as microprocessor U23 of FIG. 1B, is used to perform this task. The same microprocessor formats and transmits the telemetry data packet while simultaneously controlling the entire operation of the MIU. Thus, the meter side of the MIU is alternately called the control side.

Similarly, since it is desirable to have the MIU be self-powered from the phone line (with the exception of a small battery 15 to sustain the real time clock U24 in the static standby mode), the loop current from the central office switch provides the primary power source for the MIU. Consequently, the phone line side of the MIU is also referred to as the primary side.

The components used to implement this invention are contained principally on the primary side of the MIU in FIG. 1A. However, for completeness, FIG. 1B is included to teach how the whole MIU is operationally configured and to demonstrate the principles of how the remote telemetry device (MIU) of the invention operates. Accordingly, FIG. 1B is a simplified representation of the control side of a functional MIU.

Before discussing the operation of the MIU it is important to recall that the MIU illustrated is one which is line-powered. That is, the MIU draws all its operating power from the telephone line itself, with the exception of the already mentioned small battery 15 which maintains the real time clock. In the static mode, this power is very minute, less than 10 µA per FCC requirements. To meet this stringent requirement, all the logic shown on the primary side of the MIU (FIG. 1A) is static CMOS logic. Since CMOS logic consumes virtually no power unless some logical input changes state, the standby current of the MIU can be made extremely small. To appreciate how small this current is, it is noted that the value of resistor R1, which limits the standby current drain of the CMOS logic, is approximately 6–10 MΩ.

Referring to FIG. 1A, the open circuit voltage, $V_{IN}$, of the telephone line (approx 48 volts) appears at the input terminals 20A and 20B of the MIU when the line is first connected to the MIU. Other telephone devices or contending devices 21 are also coupled to the phone line to which input terminals 20A and 20B are coupled. A diode bridge 25 at the MIU input assures that it is both polarity insensitive and that the more positive voltage potential always appears on the Vp side of the bridge. For reasons explained shortly, power FET Q1 is off so no current is drawn through that device. Hence, only a small amount of current is drawn through zener D1 and resistor R1. Zener diode D1 and parallel capacitor C1 form a simple voltage regulator to stabilize the operating voltage of the CMOS logic at approximately 5 volts, the zener voltage of diode D1. Recalling that the value of R1 is approximately 6–10 MΩ, the current drain of the MIU in the static, quiescent state is minuscule.

When the MIU is first connected to the telephone line, i.e. the device is first powered up, the series resistor R and capacitor C momentarily holds the input to OR gate U4 at a logic high state. This provides a "one-shot" power-up pulse to the reset input of SR (set-reset) flip-flop U5 so as to initialize all the logic on the primary side of the MIU. The width of this power-up pulse is proportional to the R-C time constant and causes SR flip-flops U5, U8 and U2 to be reset in sequence; the reset condition is one where the Q output of the flip-flop is a logic low and the Q (or not-Q) is a logic high. Since the SR flip-flop U8 is reset, the Q output is a logic low assuring that power FET Q1 is turned off, per the earlier assumption. At power-up, the initial state of SR flip-flop U13 is unknown. However, this is only a temporary condition since once the output of inverter U1 toggles the SR flip-flop U13 will be reset.

This logical state of the MIU is the static or quiescent mode, as described earlier. With FET Q1 off and diode D3 blocking any return current, only components to the left of capacitor C1 are actively biased by leakage current from the subscriber loop. In this static mode, the minuscule standby current drawn by the MIU is sufficient to operate the CMOS logic, the static off-hook detector and establish an operating voltage across zener diode D1 prior to returning to the phone line through the resistor R1.

To place the MIU in the active mode, power FET Q1 is turned on. In the on state, the series impedance of the FET Q1 is only a few ohms causing the MIU to draw substantial loop current (20–80 mA) through zener diode D2 and the low DC resistance of the primary winding of transformer T2. Zener diode D2 in conjunction with the filter capacitor C2 forms a voltage regulator to stabilize the operating voltage for the power inverter consisting of components oscillator U9, inverter U10, transistors Q2 and Q3, and center-tapped transformer T1.

Shortly after the MIU goes off-hook, drawing current from the subscriber loop, the voltage appearing across the filter capacitor C2 causes the oscillator U9 to become operative. The output of this oscillator is essentially a square wave with approximately a 50% duty cycle. The oscillator turns on transistors Q3 and Q2 (via inverter U10) on opposite phases of the square wave, alternately energizing each side of the center-tapped transformer T1. The switching action of transistors Q2 and Q3 on the primary side of transformer T1 drives an AC power signal into the transformer which is magnetically coupled to the transformer T1's secondary winding on the other side of the isolation barrier 10 as seen in FIG. 1B. The recovered AC power signal appearing across this secondary winding is then full wave rectified and filtered so as to provide DC operating power for the components on the meter side of the MIU (again, in FIG. 1B). Thus, operating power for the MIU in the active mode is derived entirely from the telephone line loop current.

Again referring to FIG. 1A, several other components are present on the telephone line side of the MIU. Most noticeably, a static off-hook detector 30 consisting of inverter U1, resistors R2 and R3, and transistor Q8 monitors the telephone line input to the MIU and provides a logic high indication if the telephone line is available for use. (One such static off-hook detector is disclosed in my patent entitled "Signal Processing Circuit For Use In Telemetry Devices", U.S. Pat. No. 5,202,916.) Also as seen in FIG. 1A, a timer U6 provides a logic high output once 2.8 seconds, or more, have elapsed since the timer was enabled by removal of a logic high resetting signal. Finally, three receptor transistors Q4, Q5 and Q6 for three opto-couplers allow logic signals to be transferred across isolation barrier 10, from the control side (FIG. 1B) to the primary side (FIG. 1A). Each opto-coupler includes a sender and a light emitting diode (LED) which is optically coupled to, but electrically isolated from, the receptor transistor. When the LED is activated the light falling on the receptor transistor causes the transistor to turn on.

Previously, it was noted that to switch the MIU from a static mode to an active mode required FET transistor Q1 to be turned on, from its normally off condition. It will be shown that, at an appointed alarm time, the MIU's real time clock U24 will generate a short start pulse. This pulse will be transferred across isolation barrier 10 via an opto-coupler K4, momentarily activating transistor Q4. Recalling that in the static mode all SR flip-flops are initially reset (Q=logic low), the momentary logic high appearing on the set input of SR flip-flop U5 will set the Q output to a logic high.

If the telephone line is not being used at this time, then the output from the static off-hook detector (output of inverter U1) will also be a logic high causing AND gate's U7 output to go high. If, however, the telephone line is in use, the logic high output from AND gate U7 will be delayed until such time as the static off-hook detector indicates that it is available. Since SR flip-flop U13 is always reset, unless the MIU is pulse dialing, the output of inverter U14 is a logic high, enabling AND gate U15. Subsequently, SR flip-flop U8 will be set, turning on FET Q1. So long as FET Q1 is on, the MIU is off*hook (in the active mode) and the MIU pulse current from the telephone subscriber loop. At the same time as Q1 is turned on, the Q output of SR flip-flop U8 goes to a logic low, enabling 2.8 second timer U6 and removing the forced reset condition on SR flip-flop U2.

With the MIU active, oscillator U9 is activated and supplies power to the secondary side of the MIU, as discussed earlier. It will be shown subsequently, that transformer T2 couples DTMF (dual tone multi-frequency) dialing tones and telemetry data across isolation barrier 10 onto the phone line, thereby dialing and transferring the telemetry data to a another site via the subscriber loop. When the telemetry data is complete, the logic on the control side of the MIU (FIG. 1B) will generate a short stop pulse which is coupled across isolation barrier 10 via opto-coupler K5 in a manner analogous to that described earlier for the start pulse.

If 2.8 seconds, or more, have elapsed since the MIU entered the active mode, this momentary logic high pulse will set the Q output of SR flip-flop U2 to a logic high, via AND gate U3. The timer U6 provides a power-up guard time of 2.8 seconds to permit the MIU logic on the control side to power up and become functional before enabling one of the AND gate U3 inputs; once the guard time has elapsed a stop pulse can set SR flip-flop U2. Should this occur, the logic high Q output of SR flip-flop U2 will cause SR flip-flop U5 to be reset (via OR gate U4) which will, in turn (via the logic high Q output), then reset RS flip-flop U8. When SR flip-flop U8 is reset the Q output goes low, turning off FET Q1, while its Q output goes to a logic high state, disabling timer U6 and resetting SR flip-flop U2 which initiated the described reset sequence. It can be seen that all SR flip-flops are now reset and that the MIU is logically in the static mode described earlier.

Referring to FIG. 1B, the full wave rectifier and filter capacitor described earlier, consisting of diodes D5 and D6, capacitor C7, can be seen. The zener diode D7 in conjunction with capacitor C7 stabilizes the DC operating voltage $V_S$ on the control side of the MIU. The LEDs K4, K5 and K6 associated with the start, stop and dial pulse opto-couplers, respectively, transfer logic level signals across isolation barrier 10 to receptor transistors Q4, Q5 and Q6 on the primary side of the MIU. It should be noted that the grounds shown on either side of the isolation barrier are not common with one another and different ground symbols are therefore used. These grounds serve as voltage datums and are not earth grounds.

Also shown in FIG. 1B, is modem U20 connected to a telephone hybrid transformer T2. These are both commonly available devices. For instance, the modem U20 could be a commercially available, off-the-shelf device such as the SC11016 manufactured by Sierra Semiconductor. This device is a single IC chip modem containing a complete 300/1200 bit per second modem, including tone dialing capability. A simplified connection to a small microprocessor U23 is shown whereby modem U20 transfers and receives data and/or instructions from processor U23. The techniques required to communicate with the modem are published in the part's specification sheet and these techniques are commonly understood by those skilled in the art. For this discussion, under microprocessor control, the modem can be commanded to tone dial a telephone number and establish a full duplex data pathway via the telephone circuit.

Also connected to microprocessor U23 is a voltage comparator U22. This off-the-shelf component is designed as supervisory circuit for microprocessors and generates a logic low resetting signal should the input voltage drop below a predetermined level. Typically, these three terminal comparators are available in a variety of preset trigger points, from a variety of manufacturers. Using parts manufactured by Ricoh, U22 could be a RH5VA40 with threshold voltage of 4.0 volts. Since output from these devices are of the open drain variety, a pull-up resistor is required on the output to assert a logic high state.

The function of voltage comparator U22 is to hold the processor reset until the bias voltage exceeds 4.0 volts. There are two operational scenarios where the comparator output is a logic low, which resets the processor. Firstly, during the power-up sequence the processor is held reset until the bias voltage exceeds the threshold voltage of the comparator, thereby allowing the processor to start only after a safe operating voltage has been reached. And, secondly, as the processor is powered down to an off condition (as when the MIU returns to the static mode) it is held reset once the bias voltage droops below the threshold voltage of the comparator. In parallel with the output of voltage comparator U22 is the normally open collector of transistor Q7. Under processor control, transistor Q7 can be turned on so as to force the MIU back to the static mode, via opto-coupler LED KS. The processor normally activates transistor Q7 to "hang-up" the MIU (return it to an on-hook condition) after a telemetry session has been successfully completed.

The microprocessor U23 shown is a commonly available single chip microcontroller with an 8 bit architecture, such as the Motorola MC68HC705C8. This processor has non-volatile memory which can retain selected MIU data even after the power has been turned off, for instance the telephone number the MIU dials after it is activated. The processor can communicate on an bus 34 with a variety of peripheral devices, including the real time clock U24 shown in FIG. 1B. This real time clock U24 is connected to the 8 bit wide data bus 34 and is a commercially available part, such as the Ricoh RP5C15. Four control lines 35 between microprocessor U23 and real time clock U24 facilitate communications between the devices. Diode D8 assures that the voltage appearing across the power supply terminals of the real time clock can never be less than one diode drop below the battery voltage, thereby maintaining constant power to the clock. Since the MIU spends most of its time in the static mode, diode D9 blocks any return current to the negative battery terminal assuring that only the real time clock consumes precious battery power in the standby mode.

III. Dynamic Off-Hook Detector; Detailed Operation

Now that the elements of FIG. 1A and FIG. 1B have been described, the operation of the MIU and the invention can be more fully explained. This discussion starts with the MIU depicted in FIG. 1A and 1B and assumes that the MIU is initially in the static mode (static state), and traces the operation of the MIU as it enters the active mode (active state) where the techniques of this invention are primarily implemented.

Referring to FIG. 1B, with the MIU in a standby condition the only electrically active components are those of the real time clock U24 which is maintained by small battery 15. Real time clock 15 has an alarm feature which causes the device to output a short pulse at a predetermined time and date. In the prior telemetry session, the current alarm time and date for the MIU were set by the central processing center prior to the conclusion of the telemetry exchange and the real time clock was appropriately programmed. At the appointed moment, the clock will output a short pulse which will be transferred across isolation barrier 10, via the activation of opto-coupler LED K4. If the telephone line is available, or when it becomes available, the MIU will enter the active mode as previously described, causing a power signal to be present on the secondary winding of power inverter transformer T1. This signal is full wave rectified and provides operating voltage $V_S$ for components on the control side of the MIU.

As the filter capacitor C7 begins to charge the supply voltage $V_S$ will rise to about 5 volts, the breakdown voltage of zener diode D7 (see. FIG. 1B). At some point below the 4.0 volt threshold of comparator U22, the logic low output will activate the opto-coupler LED K5. However, as noted earlier, the design of the MIU is such that it ignores any stop pulse generated within the first 2.8 seconds after the MIU becomes active so the stop pulse generated as the MIU powers up into an active mode is ignored. When the supply voltage exceeds 4 volts the output of the comparator is a logic high and the MIU is fully powered up.

The next sequence of events is for the MIU to dial a preprogrammed telephone number in order to upload telemetry data to a central processing center or other predetermined station. Earlier it was noted that the modem U20 was a commercially available device which could use tone (DTMF) dialing, if desired. Although DTMF dialing is faster, some telephone exchanges require pulse dialing and, as noted earlier, the MIU often automatically defaults to the universally accepted pulse dialing format as a last resort if the DTMF tone dialing is unsuccessful. When pulse dialing is used, microprocessor U23 precisely generates the dialing waveform at the proper pulse rate, with the proper break-make ratio described earlier. This dialing waveform is directed to an output port on microprocessor U23, activating opto-coupler LED K6 and thereby coupling the signal across the isolation barrier.

Recalling that pulse dialing works by interrupting the loop current in a prescribed manner, FET Q1 must be momentarily turned off to break the loop current. Typically, the pulse period is 100 mS, requiring a 60 mS break in the loop current. Thus, the dialing waveform appearing at the output of opto-coupler receptor transistor Q6 would be a 60 mS logic high signal with a repetition rate of 100 mS. During this 60 mS break interval the output of SR flip-flop U13 will be set to a logic high, as the simultaneous application of the same signal to NOR gate U12 blocks any resetting signal (output of NOR gate U12 is forced low). During this break interval, the output of inverter U14 is a logic low, thereby turning off power FET Q1 via AND gate U15.

During this momentary interruption of the loop current, the energy stored in capacitors C2 and C7 maintains the necessary operating voltages on both sides of isolation barrier 10 so that the operation of the MIU is not adversely effected. Thus, even though the MIU continues to operate at nearly full power, it is fully disconnected from the subscriber loop. Since this is equivalent to momentarily returning the telephone line to an on-hook condition, the output from static off-hook detector 30 is valid during the break interval.

When the subscriber loop is momentarily opened, the nominal 48 volts from the central office battery would appear across the open-circuited phone line during the break interval, provided no other telephone device was off-hook. The design of static off-hook detector 30 is such that transistor Q8 cannot remain on if another telephone device is simultaneously off-hook. Consequently, the output of inverter U1 will be a logic high during the break portion of the dialing waveform only if there is no other telephone device off-hook. Under these circumstances, the output of inverter U16 will be a logic low, causing the output of AND gate U11 also to be a logic low. At the conclusion of the break interval, the logic high signal which initially set SR flip-flop U13, simultaneously holding the output of NOR gate U12 low, will be removed. Since both inputs to NOR gate U12 are then logic lows, the output of the gate will be driven to a logic high condition, thereby resetting SR flip-flop U13 and turning power FET Q1 back on, via inverter U14 and AND gate U15. Thus, the gating of power FET Q1 will correspond directly to the dial pulse waveform generated by microprocessor U23 on the control side of the MIU. Normally, this process will repeat until the pulse dialing is complete.

If, however, another telephone device comes off-hook while the MIU is pulse dialing, then the output of inverter U16 will be a logic high at the conclusion of the break interval. Since the dialing waveform initially set SR flip-flop U13, both inputs to AND gate U11 are logic highs and the output of NOR gate U12 is forced to a logic low, preventing the reset of SR flip-flop U13. Thus, the power FET Q1 cannot be turned back on and the MIU is prevented from returning to an off-hook condition. As noted earlier, the MIU is designed to tolerate the brief interruptions in the loop current normally encountered as part of pulse dialing format. However, the MIU cannot tolerate a sustained interruption in its primary power source and the operating voltages will begin to droop as the energy in capacitors C2 and C7 is depleted. As previously described, when the operating voltage $V_S$ for the microprocessor U23 drops below the threshold of voltage comparator U22 a stop pulse will appear at the output of opto-coupler receptor transistor Q6, resetting the MIU to the static mode.

It is specifically noted that this technique has an advantage in that another off-hook telephone device can be rapidly detected, in less that one dial pulse interval. While it takes the MIU substantially longer to return to the static mode, the MIU is nonetheless almost immediately disengaged from the telephone line when a contention scenario arises.

It should be noted that automatic meter reading systems represent only one application where telephone line telemetry devices and techniques are utilized. Although for example purposes mainly AMR applications have been discussed herein, those skilled in the art will appreciate that the same apparatus and methodology are equally suitable for use in a broad and diverse range of applications which employ remote monitoring techniques and devices. A partial list of other applications would include copy and vending machine monitors, industrial monitoring of remote processes (for instance, oil field flow systems) and remote monitoring of diesel generators or like industrial equipment.

While the above description sets forth a telemetry apparatus, it is clear that a method of operating the telemetry apparatus is also disclosed. More particularly, a method of operating a telemetry device coupled to a phone line at a remote location is disclosed wherein the device resides in a static state until a predetermined time when the device enters an active state to seize the phone line to transmit data back to a central station over the phone line. The telemetry device includes a static off-hook detector for determining when a contending device seizes the phone line while the device is in the static state. The disclosed method includes the step of pulse dialing by the device over the phone line to generate a dial pulse with alternating on-hook portions and off-hook portions thus commencing the active state. The method also includes the step of monitoring the static off-hook detector during the on-hook portions of the dial pulse to determine if a contending device seizes the phone line. The method still further includes the step of disengaging the device from the phone line during the pulse dialing if in the monitoring step it is determined that a contending device is seizing the phone line during an on-hook portion of the dial pulse.

The foregoing has described a telemetry device including a dynamic off-hook detector which remains operational during pulse dialing.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A method of operating a telemetry device coupled to a phone line at a remote location, said telemetry device residing in a static state until said telemetric device enters an active state to seize said phone line to transmit data back to a central station over said phone line, said telemetry device including a static off-hook detector for determining when a contending device seizes said phone line while said telemetry device is in said static state, said method comprising the steps of:

pulse dialing by said telemetry device over said phone line to generate a dial pulse signal with alternating on-hook portions and off-hook portions when said telemetry device enters said active state;

monitoring said static off-hook detector during said on-hook portions of said dial pulse signal to determine if the contending device goes off-hook and seizes said phone line, and disengaging said telemetry device from said phone line during said pulse dialing if in said monitoring step a determination was made that the contending device is seizing said phone line during an on-hook portion of said dial pulse signal.

2. A telemetry device for collecting and transmitting data over a phone line to a central station, the telemetry device comprising:

data collecting means for collecting data at a remote location;

transmitting means, coupled to said collecting means, for transmitting said data over said phone line to said central station during an active state of said telemetry device in which said telemetry device seizes the phone line, said telemetric device otherwise being in a static state when said telemetry device is not seizing said phone line;

static off-hook detector means, coupled to said phone line, for determining when a contending device goes off-hook and seizes said phone line while said telemetry device is in said static state;

pulse dialing means, coupled to said phone line, for dialing said central station, said dialling means generating a dial pulse signal with alternating on-hook portions and off-hook portions, and dynamic off-hook detector means, coupled to said static off-hook detector means, for disengaging said telemetry device from said phone line during pulse dialing when during an on-hook portion of said dial pulse signal, said static off-hook detector means indicates that the contending device has seized the phone line.

3. The telemetry device of claim 2 wherein said dynamic off-hook detector means comprises a current robbing type dynamic off-hook detector.

4. A telemetry device for collecting and transmitting data over a phone line to a central station, said phone line exhibiting a loop current, said telemetry device comprising:

voltage deriving means, coupled to said phone line, for deriving a voltage dependent on the loop current of said phone line, said voltage being designated the derived voltage;

data collecting means for collecting data at a remote location;

transmitting means, coupled to said collecting means, for transmitting said data over said phone line to said central station during an active state of said telemetry device in which said telemetry device seizes the phone line, said telemetry device otherwise being in a static state when said telemetry device is not seizing said phone line;

static off-hook detector means, coupled to said phone line, for determining when a contending device coupled to said phone line goes off-hook and seizes said phone line while said telemetry device is in said static state;

pulse dialing means, coupled to said phone line, for dialing said central station, said dialing means generating a dial pulse signal with alternating on-hook portions and off-hook portions, and a dynamic off-hook detector including:

voltage drop detecting means, coupled to said voltage deriving means, for detecting when said derived voltage decreases to a predetermined voltage level thus indicating that the contending device coupled to said phone line has come off-hook during said active state;

first disengaging means for disengaging said telemetry device from said phone line when said voltage drop detecting means indicates that the contending device coupled to said phone line has come off-hook during said active state, and second disengaging means for disengaging said telemetry device from said phone line during pulse dialing when during an on-hook portion of said dial pulse signal, said static off-hook detector means indicates that the contending device has come off-hook and seized the phone line.

5. A telemetry device for collecting and transmitting data over a phone line to a central station, said telemetry device comprising:

a power supply, coupled to said phone line, for supplying power supply voltage to said telemetry device;

data collecting means for collecting data at a remote location;

transmitting means, coupled to said collecting means, for transmitting said data over said phone line to said central station during an active state of said telemetry device in which said telemetry device seizes the phone line, said telemetry device otherwise being in a static state when said telemetry device is not seizing said phone line;

static off-hook detector means, coupled to said phone line, for determining when a contending device goes off-hook and seizes said phone line while said telemetry device is in said static state;

pulse dialing means, coupled to said phone line, for dialing said central station at a predetermined time, said dialing means generating a dial pulse signal with alternating on-hook portions and off-hook portions, and a dynamic off-hook detector including:

voltage drop detecting means, coupled to said power supply, for detecting when said power supply voltage decreases to a predetermined voltage level thus indicating that the contending device coupled to said phone line has come off-hook during said active state;

first disengaging means for disengaging said device from said phone line when said voltage drop detecting means indicates that the contending device coupled to said phone line has come off-hook during said active state, and second disengaging means for disengaging said telemetry device from said phone line during pulse dialing when during an on-hook portion of said dial pulse signal, said static off-hook detector means indicates that the contending device has come off-hook and seized the phone line.

6. A method of operating a telemetry device coupled to a phone line at a remote location, said telemetry device residing in a static state until a predetermined time when said telemetry device enters an active state to seize said phone line to transmit data back to a central station over said phone line, said telemetry device including a static off-hook detector for determining when a contending device coupled to said phone line seizes said phone line while said telemetry device is in said static state, said telemetry device including a power supply coupled to said phone line for supplying power supply voltage to said telemetry device, said method comprising the steps of:

pulse dialing by said telemetry device over said phone line to generate a dial pulse signal with alternating on-hook portions and off-hook portions when said telemetry device enters said active state;

monitoring said static off-hook detector during said on-hook portions of said dial pulse signal to determine if the contending device goes off-hook and seizes said phone line;

disengaging said telemetry device from said phone line during said pulse dialing if in said monitoring step a determination was made that the contending device is seizing said phone line during an on-hook portion of said dial pulse signal, and disengaging said telemetry device from said phone line when said power supply voltage decreases to a predetermined voltage level thus indicating that the contending telephone device coupled to said phone line has come off-hook during said active state.

* * * * *